July 10, 1951 N. R. INGLIS 2,560,349
AIR CONDITIONER

Filed April 23, 1949 2 Sheets-Sheet 1

INVENTOR.
Norman R. Inglis.
BY W. B. Harpman
ATTORNEY.

July 10, 1951 N. R. INGLIS 2,560,349
AIR CONDITIONER
Filed April 23, 1949 2 Sheets-Sheet 2
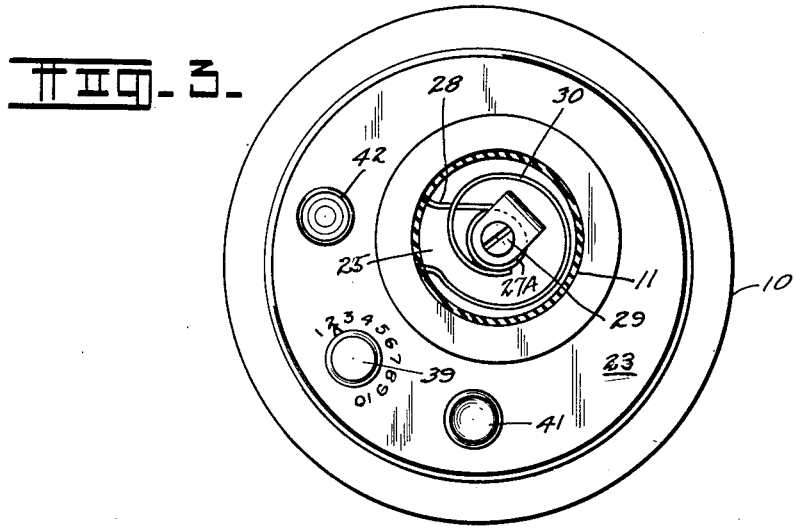
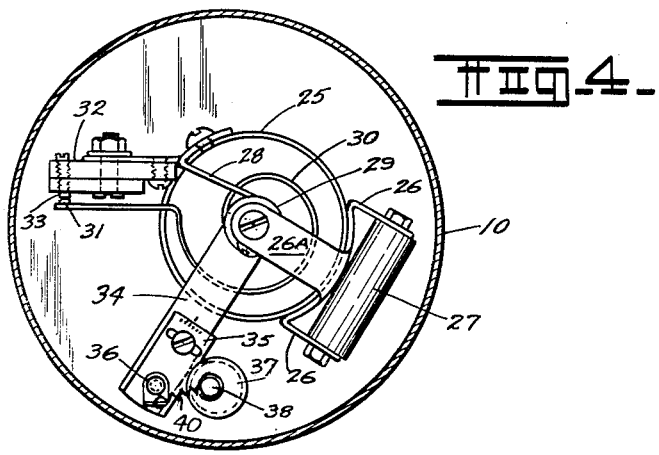
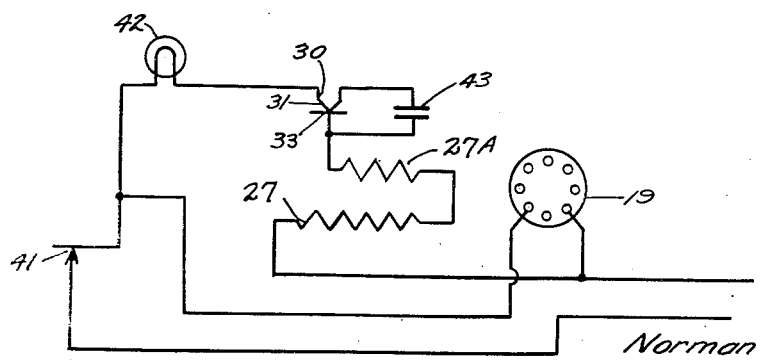
INVENTOR.
Norman R. Inglis.
BY
W. B. Haupman
ATTORNEY.

Patented July 10, 1951

2,560,349

UNITED STATES PATENT OFFICE 2,560,349

AIR CONDITIONER

Norman R. Inglis, Youngstown, Ohio

Application April 23, 1949, Serial No. 89,250

5 Claims. (Cl. 219—39)

This invention relates to air conditioning apparatus and more particularly to a lightweight compact air conditioning apparatus particularly adapted for warming or cooling a bed.

The principal object of the invention is the provision of an air conditioning apparatus for a bed.

A further object of the invention is the provision of a small, quietly operating air conditioning apparatus that will supply air of controlled temperature to a bed.

A still further object of the invention is the provision of an air conditioning unit incorporating a flexible hose for delivering the air to the bed.

A still further object of the invention is the provision of an air conditioning unit that compensates for room temperature changes and maintains temperature of air delivered therefrom with very little variance from the degree of temperature desired.

The air conditioner for beds shown and described herein comprises a relatively simple and inexpensive device which can be positioned on the floor near the foot of the bed and will operate to introduce a gentle flow of conditioned air into the bed and beneath the covers thereon. The device is particularly adapted for use in maintaining desirable temperatures in a sick room and in warming a person suffering from shock or various conditions resulting from heart ailments and the like.

The device is suitable for household use as it enables very light bed coverings to be used which achieve a higher degree of comfort than heretofore believed possible, as the air temperature within the bed coverings may be uniformly maintained through the operation of the device and no reliance made on confining body temperatures.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 3 is a horizontal cross section taken on line 3—3 of Figure 2.

Figure 4 is a horizontal cross section taken on line 4—4 of Figure 2.

Figure 5 is a wiring diagram.

Figure 1:
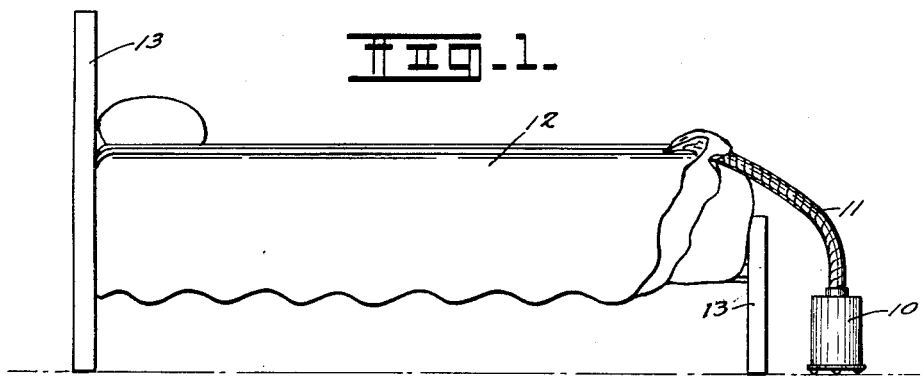
Figure 1 is a side view of a bed showing the air conditioner for beds in connection therewith.

By referring to the drawings and Figure 1 in particular it will be seen that the air conditioner for beds comprises a cylindrical housing 10 having an air delivering hose 11 in communication therewith and the hose positioned beneath a bed covering 12 on a bed 13 so that air, conditioned by the device, can be delivered into the bed beneath the covering 12 thereof.

Figure 2:
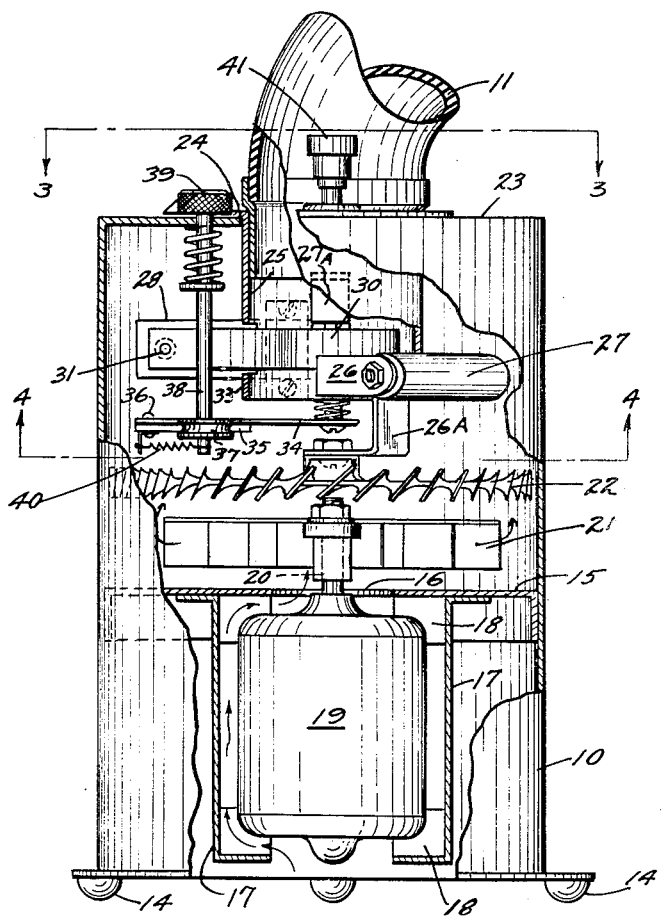
Figure 2 is a side view with parts broken away and parts in cross section illustrating the air conditioner.

By referring to Figure 2 of the drawings the device will be seen to comprise the cylindrical housing 10 mounted on a plurality of cushioning supports 14. The cylindrical housing 10 has a partition 15 positioned transversely therein, which partition is apertured as at 16 and supports a plurality of brackets 17 which position a plurality of motor blocks 18 formed of resilient material and caging an electric motor 19. The electric motor 19 is positioned with a shaft 20 in vertical position and the upper end of the shaft 20 is provided with a fan 21. It will thus be seen that when the motor 19 is energized, air will be drawn inwardly through the open bottom of the cylindrical housing 10, upwardly around the motor 19 and through the aperture 16 by the fan 21. A stator 22 comprising a plurality of radially spaced louvers is positioned immediately above the fan 21 and is provided to change the centrifugal direction of air flow from the fan 21 to a vertical flow and direct it in an annular pattern vertically within the upper end of the housing 10 which is closed by a top wall 23.

The top wall 23 has an outlet opening 24 off-center therein and a sleeve 25 disposed therein and extending downwardly into the area of the cylindrical housing 10. The sleeve 25 has a mounting bracket 26 on one side thereof which supports a resistance heating unit 27 and a portion of the mounting bracket 26A extends downwardly and supports the stator 22, heretofore referred to, it being observed that the veins in the stator 22 are formed in a radial pattern about the outermost edge thereof while the center thereof is blank. Vertical air currents rising about the stator 22 flow in an annular pattern up into the area of the housing 10 and about the exterior of the sleeve 25 and then flow downwardly thereabout and into its open lower end and thence outwardly through the sleeve 25 and into the flexible hose 11 which is removably attached thereto. The other end of the hose 11 comprises the delivery outlet of the device as utilized in Figure 1 of the drawings and heretofore described. The sleeve 25 has a secondary bracket 28 secured thereto and a portion thereof extends into the center of the sleeve 25, as best shown in Figure 3 of the drawings, where it is formed in a loop and used to support a vertically positioned screw 29 which in turn carries a bimetallic member 30 in spiral shape, the innermost end of the spiral being positioned on the screw 29.

The outermost end of the bimetallic member 30 has a contact point 31 thereon and is positioned adjacent the outermost end of the bracket 28, heretofore referred to, which carries an insulating member 32 and another contact point 33 in oppositely disposed relation to the contact point 31 heretofore referred to. Circuit wires controlling the heating element 27 are connected to the points 31 and 32, respectively, so that the thermostat will control the same when connected with a suitable power source. The main spiral body of the bimetallic element 30 is disposed within the sleeve 25 and in the outlet of the air conditioner for beds so that the temperature of the air delivered by the device may be most accurately controlled. Additionally, the cool air introduced into the device by the squirrel cage fan 21 and flowing through the stator 22 tends to cool the mounting bracket 28 and thereby increase the efficiency of the thermostat as the cooling effect of the cool air currents on the mounting bracket 28 tend to increase the sensitivity of the thermostat as they offset in some degree the action thereof arising from its subjection to the warm air flow through the sleeve 25 of the device.

A secondary resistance heating element 27A is mounted on top of the adjustment nut 29 in a mounting bracket and the secondary resistance heating element 27A is wired in series with the heating element 27, heretofore referred to, as may be seen by referring to the wiring diagram comprising Figure 5 of the drawings. The secondary heating element 27A heats the air after it has passed over the bimetallic element 30 of the thermostat and thereby enables the device to maintain a constant output of warm air despite the cycling action of the thermostat in controlling the two heating elements 27 and 27A. The result of the operation of this construction is, in effect, an overriding of the preset temperature and the avoidance of "cold" cycles in the normal operation of the device.

By referring to Figure 2 of the drawings it will be seen that the sleeve 25 is cutaway as at 33 to provide clearance for the bracket 28 and the bimetallic element 30 and the screw 29 has an adjustment arm 34 secured to the bottom thereof and extending sidewardly with respect thereto as best seen in Figures 2 and 4 of the drawings. The adjustment arm 34 has a secondary adjustment arm 35 pivoted as at 36 to the outermost end thereof and the secondary adjustment arm 35 is relatively wider than the adjustment arm 34 and positioned adjacent a cam 37 located on the lower end of a shaft 38, the upper end of which extends through the top wall 23 and is provided with a knurled dial 39. Rotation of the dial 39 will move the cam 37.

The cam shaft 38 is connected with the outermost end of the secondary adjustment arm 35 to a spring 40 so that movement of the cam 37 will result in moving the secondary adjustment arm 35 as well as the adjustment arm 34 toward and away from the cam shaft 38 thereby turning the screw 29 and hence tightening or loosening the innermost end of the spirally formed bimetallic element 30 and achieving the desired control thereof and with respect to the point 31 on the outermost end thereof.

By referring to Figures 2 and 3 of the drawings, it will be seen that an off and on switch 41 is positioned in the device with the actuating member thereof extending above the top wall 23 and controlling the circuit energizing the heating element 27 heretofore referred to. Also in the circuit there is a pilot light 42 which operates whenever the switch 41 is closed.

By referring to Figure 5 of the drawings and the wiring diagram, it will be seen that the fan motor 19 is indicated symbolically and that the bimetallic element 30 is indicated symbolically and that the same has a condenser 43 shunted therearound to prevent arcing between the points 31 and 33 heretofore described. It will also be seen that the fan motor 19 is connected directly with the 110 volt power source subject to control of the switch 41 while the heating element 27 is under control of the bimetallic thermostat 30 and operates intermittently while the fan motor 19 operates continuously when the switch 41 is closed.

It will occur to those skilled in the art that the flexible hose 11 is preferably provided with a removable casing or jacket which may be removed and laundered and that means comprising a clamp or pin is preferably employed for securing the outermost end of the flexible hose 11 in a desired location on the bed and beneath the covering.

It will thus be seen that an air conditioner for beds has been disclosed which meets the several objects of the invention.

Having thus described my invention, what I claim is:

1. Air conditioning means comprising a housing having a partition midway between its upper and lower ends, brackets depending from said partition and a motor positioned on said brackets, a shaft on said motor extending upwardly through the said partition, a fan on the said shaft and radially positioned louvers located thereabove for converting spinning air currents to vertical air currents, a heating element above the said louvers and an outlet in the said casing, and a sleeve disposed in said outlet, thermostatic means located in said sleeve and controlling said heating element, and a secondary heating element located in said sleeve and above said thermostatic means and connected with said heating element and a flexible hose detachably positioned in said outlet for delivering air therefrom to a remote point of discharge.

2. An air conditioner comprising a housing having an inlet in the bottom thereof and a motor driven fan disposed therein, an assembly of radial spaced louvers positioned above the fan and directing air therefrom in a vertical annular pattern, an outlet in the upper end of the said housing and a sleeve positioned therein and extending inwardly thereof, at least one heating element disposed in the area between the sleeve and the said housing and at least one secondary heater element disposed in the area of the said sleeve whereby air from the said fan and stator is delivered into the said area and warmed by the said heating element and evenly diffused prior to delivery from the device through the said sleeve and outlet.

3. The device of claim 2 further characterized by a bimetallic thermostat taking the form of a helix and disposed within the said sleeve between the said heating elements and controlling a power source in connection with the said heating element.

4. The device of claim 3 further characterized by the positioning of the said bimetallic element on a vertical support within the said sleeve, an arm extending sidewardly from the bottom of the said vertical support and a cam positioned adjacent the said arm and rotatable from without the said housing for adjusting the said bimetallic thermostatic element.

5. Air conditioning means comprising a housing having a partition midway between its upper and lower ends, brackets depending from said partition and a motor positioned on said brackets, a shaft on said motor extending upwardly through the said partition, a fan on the said shaft, heating elements above the said fan and an outlet in the said casing, and a sleeve disposed in said outlet, thermostatic means located in said sleeve and controlling said heating elements, one of the said heating elements being located outside the said sleeve and the other of the said heating elements being located within the said sleeve and above the said thermostatic means.

NORMAN R. INGLIS.

REFERENCES CITED

The following references are of record in the file of this patent:

UNITED STATES PATENTS

| Number | Name | Date |
|---|---|---|
| 1,936,960 | Bowman | Nov. 28, 1933 |
| 2,089,560 | Kurth | Aug. 10, 1937 |
| 2,093,834 | Gaugler | Sept. 21, 1937 |
| 2,259,712 | Sweetland | Oct. 21, 1941 |
| 2,263,174 | Klauber | Nov. 18, 1941 |

FOREIGN PATENTS

| Number | Country | Date |
|---|---|---|
| 736,335 | France | Sept. 13, 1932 |